United States Patent
Usami et al.

(10) Patent No.: US 11,836,783 B2
(45) Date of Patent: Dec. 5, 2023

(54) INFORMATION PROCESSING METHOD, INFORMATION PROCESSING DEVICE, AND NON-TRANSITORY STORAGE MEDIUM

(71) Applicant: TOYOTA JIDOSHA KABUSHIKI KAISHA, Toyota (JP)

(72) Inventors: Jun Usami, Toyota (JP); Takaharu Ueno, Nagoya (JP); Shunsuke Sagara, Nisshin (JP); Lei Wang, Toyota (JP); Shintaro Matsutani, Kariya (JP); Kyoji Iijima, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 113 days.

(21) Appl. No.: 17/523,443

(22) Filed: Nov. 10, 2021

(65) Prior Publication Data
US 2022/0164854 A1    May 26, 2022

(30) Foreign Application Priority Data
Nov. 20, 2020    (JP) ................................. 2020-193814

(51) Int. Cl.
*G06Q 30/00*    (2023.01)
*G06Q 30/0601*    (2023.01)
*G06Q 10/083*    (2023.01)

(52) U.S. Cl.
CPC ..... *G06Q 30/0631* (2013.01); *G06Q 10/0838* (2013.01); *G06Q 30/0613* (2013.01)

(58) Field of Classification Search
CPC ............................................... G06Q 30/06–08
See application file for complete search history.

(56) References Cited

U.S. PATENT DOCUMENTS

| | | | | |
|---|---|---|---|---|
| 11,435,873 | B1* | 9/2022 | Sharma | G06F 16/9538 |
| 2002/0059106 | A1* | 5/2002 | Tani | G06Q 30/0601 |
| | | | | 705/26.1 |
| 2003/0078843 | A1 | 4/2003 | Sone | |
| 2006/0173749 | A1* | 8/2006 | Ward | G06Q 30/06 |
| | | | | 705/26.8 |
| 2016/0275424 | A1* | 9/2016 | Concannon | G06Q 10/087 |

(Continued)

FOREIGN PATENT DOCUMENTS

JP    2003-132258 A    5/2003

OTHER PUBLICATIONS

Chou, S., Chang, S., and Yang, W., "Optimal Multiple Delivery Schedule for Demand in Logistic Model", Int'l J. of Production Economics 73:3 pp. 241-249 (Elsevier, Oct. 13, 2001) (Year: 2001).*

*Primary Examiner* — Ethan D Civan
(74) *Attorney, Agent, or Firm* — Sughrue Mion, PLLC

(57) ABSTRACT

A controller of an information processing apparatus executes: acquiring information indicating a sales schedule of a substitutional product of a product that a user has been purchasing by periodic delivery, in a predetermined period including a next delivery-scheduled day of the product; determining a delivery-possible day when the substitutional product can be delivered to the user, based on the information indicating the sales schedule of the substitutional product; and providing the user with recommendation information, which is information including a proposal to deliver, instead of delivering the product on the delivery-scheduled day, the substitutional product on the delivery-possible day.

20 Claims, 7 Drawing Sheets

(56) References Cited

U.S. PATENT DOCUMENTS

2017/0193582 A1* 7/2017 Guo .................. G06Q 30/0633
2020/0334635 A1* 10/2020 Busey ................. G06V 10/774
2021/0150471 A1* 5/2021 Mese ................. G06Q 10/0835

* cited by examiner

FIG. 5

| USER DB | | | | |
|---|---|---|---|---|
| ID | USER PERSONAL INFORMATION | PRODUCT INFORMATION | PURCHASE CONDITION INFORMATION | USER SETTINGS |
| U1 | •NAME<br>•CONTACT ADDRESS<br>•DELIVERY ADDRESS | •PRODUCT ID<br>•NAME<br>•CATEGORY<br>•SUGGESTED SALES PRICE<br>•DETAILED INFORMATION | •PURCHASE PRICE<br>•PERIODIC-DELIVERY DAY<br>•NUMBER OF PURCHASES | •SEARCH RANGE<br>•TYPE OF PREFERENCE<br>•SEARCH NUMBER<br>•SEARCH MODE |
| U2 | | | | |
| U3 | | | | |
| U4 | | | | |
| U5 | | | | |

FIG. 6

| PRODUCT DB | | | | |
|---|---|---|---|---|
| PRODUCT ID | PRODUCT INFORMATION | PREFERENCE TYPE | SUPPORT SITE | EQUIVALENT PRODUCT INFORMATION |
| C1 | • NAME<br>• CATEGORY (TYPE)<br>• SUGGESTED SALES PRICE<br>• DETAILED INFORMATION | | | |
| C2 | | | | |
| C3 | | | | |
| C4 | | | | |
| C5 | | | | |

. . .

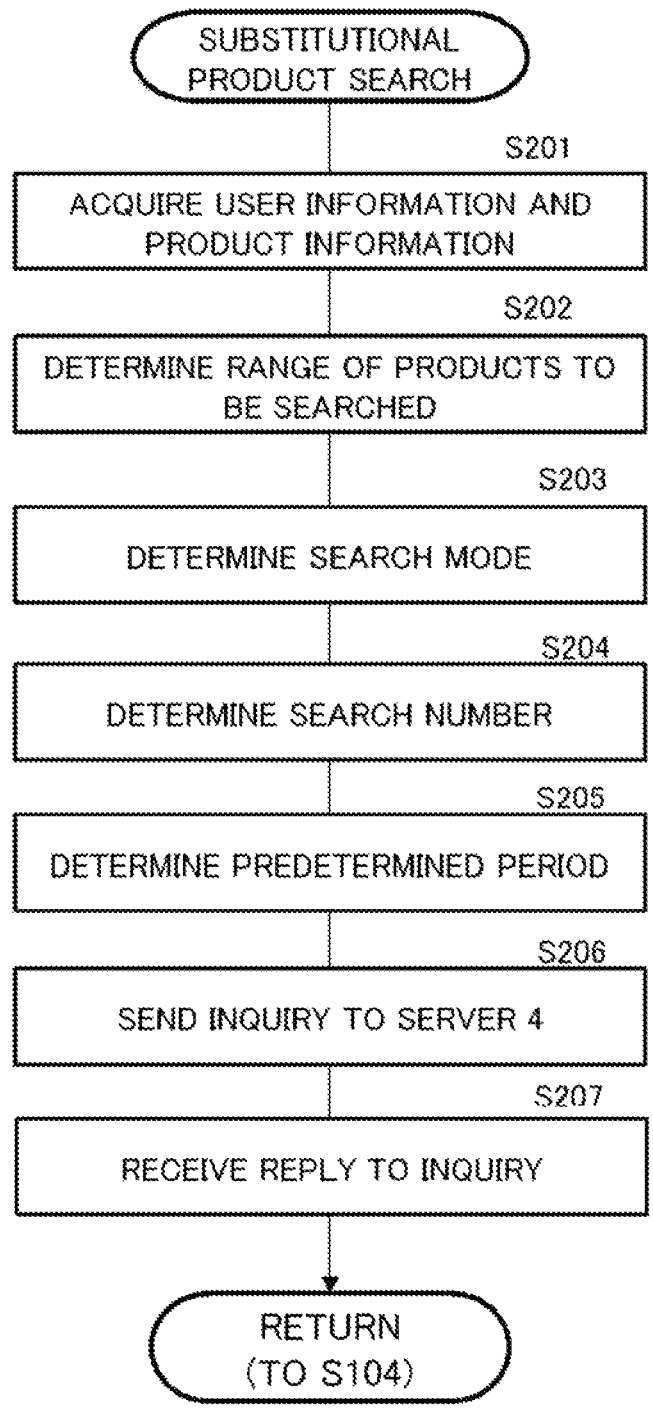

INFORMATION PROCESSING METHOD, INFORMATION PROCESSING DEVICE, AND NON-TRANSITORY STORAGE MEDIUM

CROSS-REFERENCE TO RELATED APPLICATION

This application claims the benefit of Japanese Patent Application No. 2020-193814, filed on Nov. 20, 2020, which is hereby incorporated by reference herein in its entirety.

BACKGROUND

1. Technical Field

The present disclosure relates to an information processing apparatus, an information processing method, and a non-transitory storage medium.

2. Description of the Related Art

There is a conventional technique that calculates a purchasing cycle of a product in a category specified by a customer using a purchasing history of the customer, and that notifies the customer of the next purchasing day so that the customer can reserve purchasing of the product (e.g. Japanese Patent Application Publication No. 2003-132258).

SUMMARY

It is an object of the present disclosure to provide an information processing apparatus, an information processing method, and a non-transitory storage medium that can contribute to improving the satisfaction level of a user who purchases a product by periodic delivery.

An aspect of the present disclosure is an information processing apparatus, including a controller, that executes: acquiring information indicating a sales schedule of a substitutional product of a product, which a user has been purchasing by periodic delivery, in a predetermined period including a next delivery-scheduled day of the periodic-purchase product; determining a delivery-possible day when the substitutional product can be delivered to the user, based on the information indicating the sales schedule of the substitutional product; and notifying the user of recommendation information which is information including a proposal to deliver, instead of delivering product on the delivery-scheduled day, the substitutional product on the delivery-possible day.

An aspect of the present disclosure may include at least one of: an information processing method; an information processing system; a program; and a recording medium recording a program, having the same features as the information processing apparatus.

The present disclosure can contribute to improving the satisfaction level of the user who has been purchasing a product by periodic delivery.

BRIEF DESCRIPTION OF THE DRAWINGS

FIG. 5 is a table indicating a data structure example of a user database;

FIG. 6 is a table indicating a data structure example of a product database; and FIG. 7 is a flow chart depicting an example of a substitutional product search processing.

DESCRIPTION OF THE EMBODIMENTS

Figure 1:
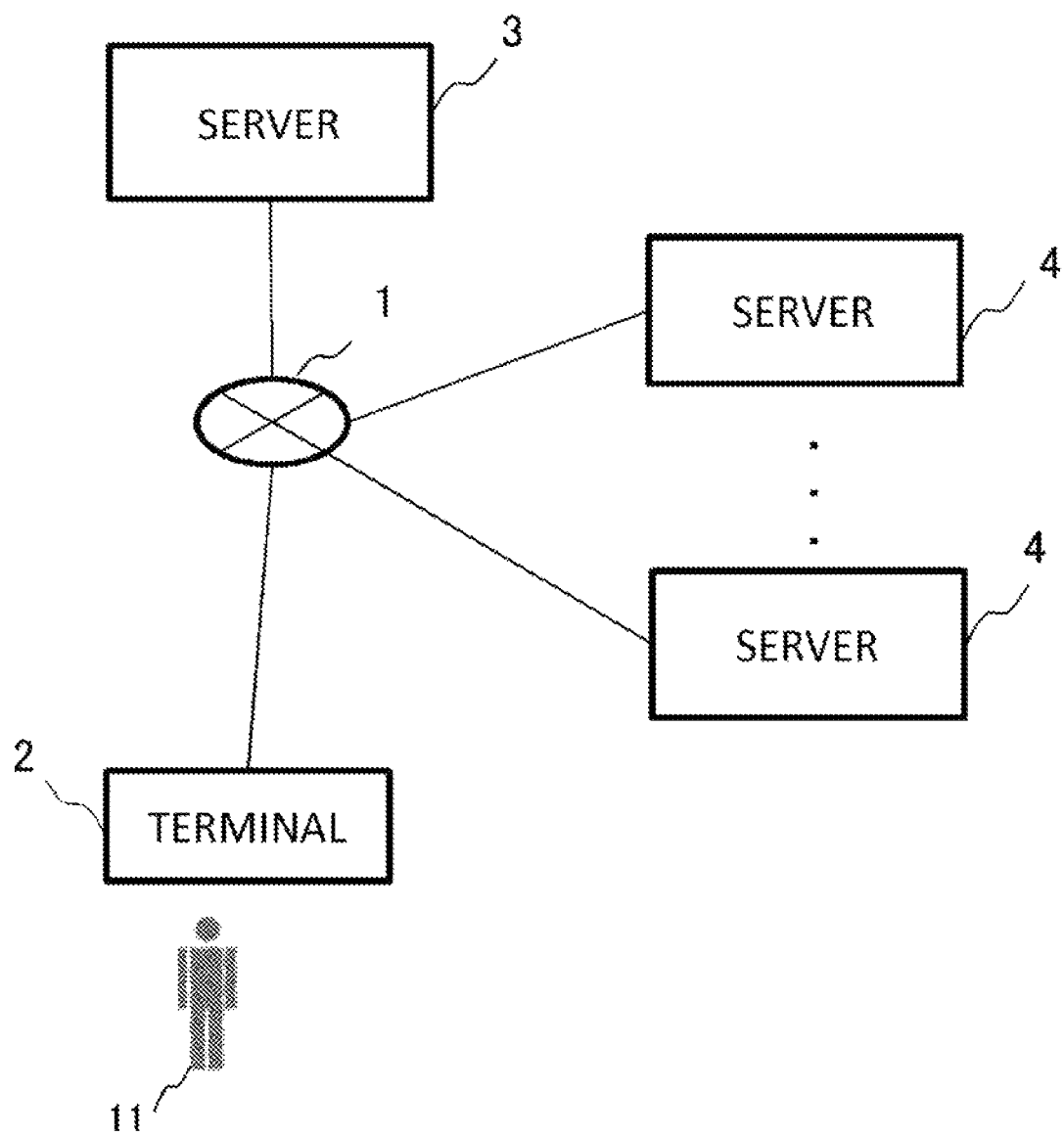
FIG. 1 is a diagram depicting an example of an information processing system according to an embodiment.

An information processing apparatus according to an embodiment includes a controller. The controller acquires information indicating a sales schedule of a substitutional product of a product, which a user has been purchasing by periodic delivery, in a predetermined period including a next delivery-scheduled day of the product. The controller also determines a delivery-possible day when the substitutional product can be delivered to the user, based on the information indicating the sales schedule of the substitutional product. Further, the controller notifies the user of recommendation information, which is information including a recommendation to deliver, instead of delivering product on the delivery-scheduled day, the substitutional product on the delivery-possible day.

According to the information processing apparatus, the user can recognize that a substitutional product will be sold around the next delivery-scheduled day of periodic delivery, and delivery of the substitutional product is possible instead of the product that is purchased by the periodic delivery. Thereby the user can have a choice to purchase the substitutional product instead of the product that is purchased by the periodic delivery. As a result, the information processing apparatus can contribute to improving the satisfaction level of the user who has been purchasing a product by periodic delivery.

The predetermined period may be the delivery-scheduled day, a period before the delivery-schedule day, a period after the delivery-scheduled day, or a period during which the delivery-scheduled day is included. The length of the predetermined period can be arbitrarily set.

The information processing apparatus may use the following configuration. The substitutional product includes an identical product of the product, which can be purchased at a lower price than the purchase price of the product, and the controller acquires information indicating the sales of the identical product as the information indicating the sales schedule of the substitutional product. Here the identical product is a product that is identical with the product that is purchased by the periodic delivery ("periodic-purchase product"). By using this configuration, the user can purchase a product that is identical with the periodic-purchase product at a lower price than the periodic-purchase product.

Further, the information processing apparatus may use the following configuration. The substitutional product includes an equivalent product of the product, and the controller acquires information indicating the sales of the equivalent product as the information indicating the sales schedule of the substitutional product. The equivalent product has standards (e.g. shape, material, size), performance, quality, functions, efficacy, effect, or the like, that are equivalent to the periodic-purchase product, and is a product that can be used instead of the periodic-purchase product. The price of the equivalent product is preferably lower than the price of the periodic-purchase product, but may be higher than the price of the periodic-purchase product. By using this configuration, the user can purchase an equivalent product that is lower in price than the periodic-purchase product, or an equivalent product that meets the preference of the user more than the periodic-purchase product, instead of the periodic-purchase product.

Further, the information processing apparatus may use the following configuration. The controller acquires information indicating the sales schedule of the substitutional product that is selected in accordance with the preference of the user, out of one or two or more substantial products that are sold within a predetermined period. Then the substitutional product included in the recommendation information can meet the preference of the user. A preference indicates an attribute of the products which the user values. The types of preferences include valuing a brand of a product (e.g. place of production or manufacture of product, producer or manufacturer, brand). The types of preferences may include valuing a price of a product, and valuing a feature (e.g. standards, quality, performance) of a product, for example. The types of preferences are not limited to the above examples. Thereby information indicating the sales schedule of the substitutional product that meets the type of the preference of the user can be acquired.

Further, the information processing apparatus may use the following configuration. The controller acquires information indicating the sales schedule of the substitutional product, selected from one or two or more substitutional products that are sold within a predetermined period. The substitutional product is selected using at least one of: information indicating a sale of each substitutional product; information indicating evaluation of each substitutional product; and information indicating whether each substitutional product is a generic product of the periodic-purchase product or an equivalent product thereof. The substitutional product is selected by the controller or a unit that is not the controller. By using this configuration, the user can purchase a substitutional product that is selling well, a substitutional product that is highly evaluated, or a generic product instead of the periodic-purchase product. The evaluation of a product may be an evaluation of a critic and/or a general word-of-mouth evaluation. The generic product is a product that has a same or similar purpose of use, structure, efficacy or effect as a conventional product, and is a generic drug, for example.

Furthermore, the information processing apparatus may use the following configuration. The image processing apparatus executes processing to order the substitutional product in accordance with an instruction input from the user for the recommendation information. By this configuration, the user can determine the necessity of purchase of the substitutional product, and input an instruction when it is determined that the purchase is necessary, whereby the substitutional product can be ordered with a simple operation or procedure. The "processing to order" may be providing the user with a dedicated or general purpose interface for the user to order the substitutional product, or providing the user with a link to jump to a website to place the order. The processing to order is not limited to these examples.

The information processing method, the information processing apparatus, and the non-transitory storage medium storing a program according to the embodiment will be described with reference to the drawings. The configurations according to the embodiment are examples, and the present disclosure is not limited to the configurations of the embodiment.

Configuration of Information System

FIG. 1 indicates an example of the information processing system according to the embodiment. In FIG. 1, the information processing system includes a network 1, and a terminal 2, a server 3 and one or two or more servers 4, which are connected to the network 1 respectively. A number of servers 4 may be arbitrarily set.

The network 1 is a public communication network, such as the Internet, and a wide area network (WAN) or other communication networks can be used. The network 1 may include such a wireless network as a cellular network, a wireless local area network (LAN), or BLE. The cellular network includes long term evolution (LTE), 5G, or the like. The wireless LAN includes Wi-Fi. The type of wireless network is not limited to the above examples.

The terminal 2 is used (operated) by a user 11. The user 11 signed a contract with a service provider who provides periodic-purchase services so as to periodically purchase a certain product. In other words, a product (periodic-purchase product) is periodically delivered to the user 11. When the user 11 applies the contract for the periodic-purchase service of the product, the user 11 sends information relating to the contract to the server 3 via the terminal 2, and the information relating to the contract is registered in the server 3.

The server 3 performs processing related to the contract for the user 11 to purchase the product by periodic delivery (periodic purchase), and performs processing for providing information to recommend the purchase of a product (recommendation information) to the user 11. Management of the server 3 may be performed by any one of: a service provider who sells a product by mail order service provider (dealer), a service provider who introduces or mediates a mail order (intermediatory service provider), and a service provider who sells products by mail and introduces/mediates the mail order. The server 3 is an "information processing apparatus" and is a "computer", for example.

The server 4 operates a website (support site) that provides information (support information) to support the purchase of products (either online or offline). The server 4 provides a web page, on which the support information is posted, to a user who accessed the support site. The support information is, for example, information indicating a sales ranking of each product that can be purchased via an online shop or the like. The support information may be information indicating points (score) of each product in a review (an evaluation) by a critic. The support information may also be information indicating the ranking of points (score) of a general word-of-mouth evaluation of each product. Further, the support information may be information indicating whether a product is a generic product of a certain product or not. At least one of the above examples is included in the support information. The information indicating the ranking of sales is an example of information indicating sales, and the points of the evaluation by critics and the points of general word-of-mouth evaluation are examples of information indicating an evaluation. Information to indicate a contact address of the online shop where the product can be purchased, or a web page posting the product related information, such as a hyperlink to a website, is displayed on the web page. The website (support site) operated by the server 4 may include a web page that functions as an online shop.

Configuration of Information Processing Device

Figure 2:
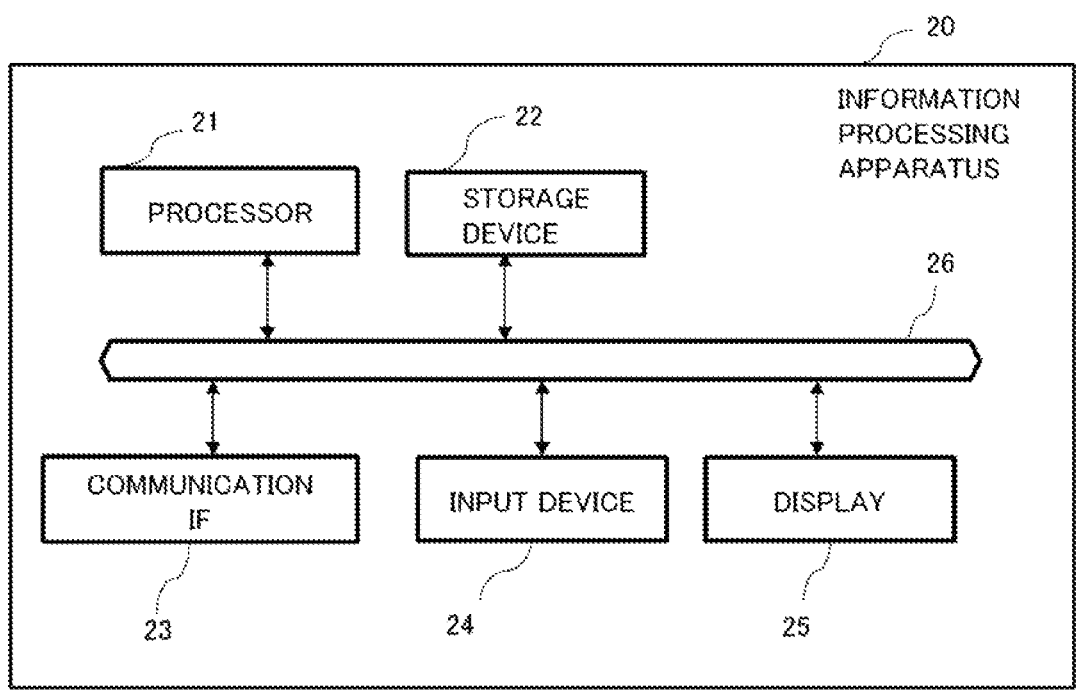
FIG. 2 is a block diagram depicting a configuration example of an information processing apparatus according to an embodiment.

FIG. 2 is a block diagram depicting a configuration example of the information processing apparatus that can operate as a terminal 2, the server 3 and the server 4 respectively. The information processing apparatus 20 is a dedicated or general purpose information processing apparatus (computer) that can be connected to the network 1 using communication functions. The communication may be cable communication or wireless communication. The information processing apparatus 20 may be a stationary terminal or a portable terminal. For example, for the information processing apparatus 20, a personal computer (PC), a workstation (WS), a smart device (e.g. smartphone, tablet terminal), a video game machine, or a car navigation device may be used. For the server 3 and the server 4, a dedicated server machine may be used. The types of the information processing apparatus 20, however, are not limited to the above examples.

In FIG. 2, the information processing apparatus 20 includes a processor 21 which functions as a processing unit or a control unit (controller), a storage device (memory) 22, a communication interface (communication IF) 23, an input device 24 and a display 25, which are interconnected via a bus 26.

The storage device 22 is an example of a non-transitory storage medium, and includes a main storage device and an auxiliary storage device. The main storage device is used as a storage area for programs and data, a developing area for programs, a work area for processors, a buffer area for communication data, and the like. The main storage device is constituted of a random access memory (RAM) or a combination of a RAM and a read only memory (ROM). The auxiliary storage device is used as a storage area for data and programs. For the auxiliary storage device, a non-volatile storage medium, such as a hard disk, a solid-state drive (SSD), a flash memory, and an electrically erasable programmable read only memory (EEPROM) may be used. The storage device 22 may include a drive device for a disk recording medium.

The communication IF 23 is a circuit to perform communication processing. For example, the communication IF 23 is a network interface card (NIC). The communication IF 23 may be a wireless communication circuit to perform wireless communication (e.g. LTE, 5G, wireless LAN (Wi-Fi), BLE). Further, the communication IF 23 may be a combination of a circuit to perform communication processing via cable and a wireless communication circuit.

The input device 24 includes at least one of: keys, buttons, a pointing device, a touch panel, and the like, and is used to input information. The display 25 is a liquid crystal display, for example, and displays information and data.

The processor 21 is a central processing unit (CPU) (also called "microprocessor unit (MPU))", for example. The processor 21 may have a single processor configuration or a multi-processor configuration. A single physical CPU connected via a single socket may have a multi-core configuration. The processor 21 may include arithmetic devices having various circuit configurations, such as a digital signal processor (DSP), or a graphics processing unit (GPU). Further, the processor 21 may have a configuration that links to at least one of: an integrated circuit (IC), other digital circuits, and analog circuits. The integrated circuit includes an LSI, an application specific integrated circuit (ASIC), a programmable logic device (PLD), and the like. The PLD includes a field programmable gate array (FPGA), for example. The processor 21 includes a micro-controller (MCU), a system-on-a-chip (SoC), a system LSI, a chip set, or the like.

The processor 21 performs various processings by executing various programs stored in the storage device 22.

Operation Example
Registration of User Information

In the terminal 2 (information processing apparatus 20 that operates as the terminal 2), the processor 21 executes the program stored in the storage device 22. By executing the program, the terminal 2 executes, for example, the processing to register the user information, including the information relating to the contract of purchasing a product (goods, commodity, or item) by periodic delivery (contract related information), to the server 3, and the processing to notify the user 11 of the recommendation information received from the server 3.

The registration to the server 3, the notification of the recommendation information, and the like, are executed using a web browser or a dedicated application program (app) installed in the information processing apparatus 20 that operates as a terminal 2.

Figure 3:
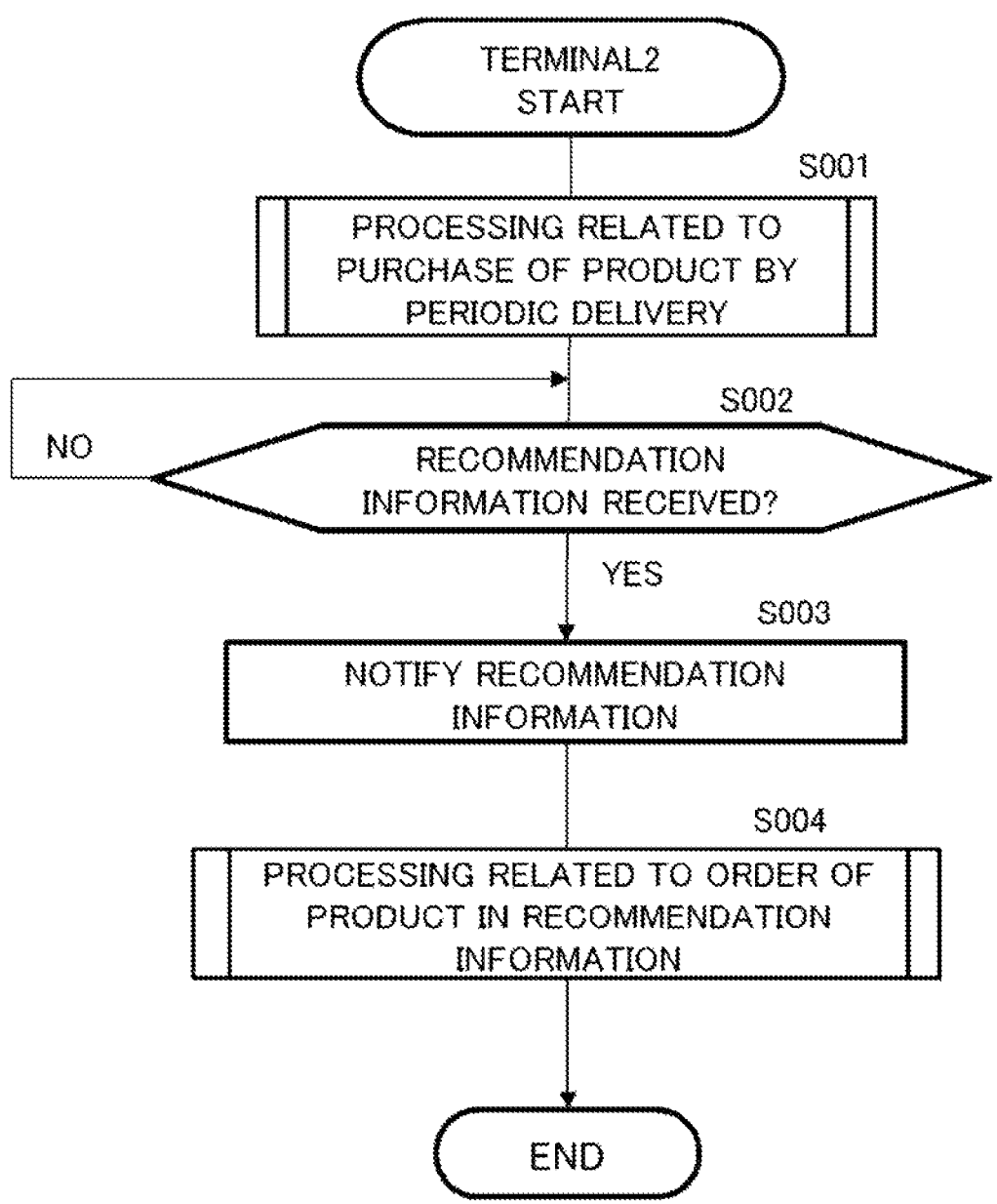
FIG. 3 is a flow chart depicting a processing example in a terminal.

FIG. 3 is a flow chart depicting a processing example in the terminal 2, and the processor 21 of the information processing apparatus 20, which operates as the terminal 2, performs the following processing steps by executing the program.

In step S001, the processor 21 of the terminal 2 performs the processing related to the purchase of the product by the periodic delivery. In other words, the processor 21 displays an information input screen on the display 25, and performs the processing to register the information relating to the contract of the purchase of the product by the periodic delivery (contract related information), which the user 11 inputted using the input device 24, to the server 3.

The contract related information includes personal information on the user 11, information on the product related to the periodic purchase (product information), and information indicating the purchasing conditions (e.g. purchase price of the product, periodic delivery day) (purchase condition information). Further, the contract related information may include information that the user 11 sets, including the search range of the product, and the search number of the product (user setting information). The terminal 2 sends a message that includes the contact related information to the server 3 via the network 1.

Figure 4:
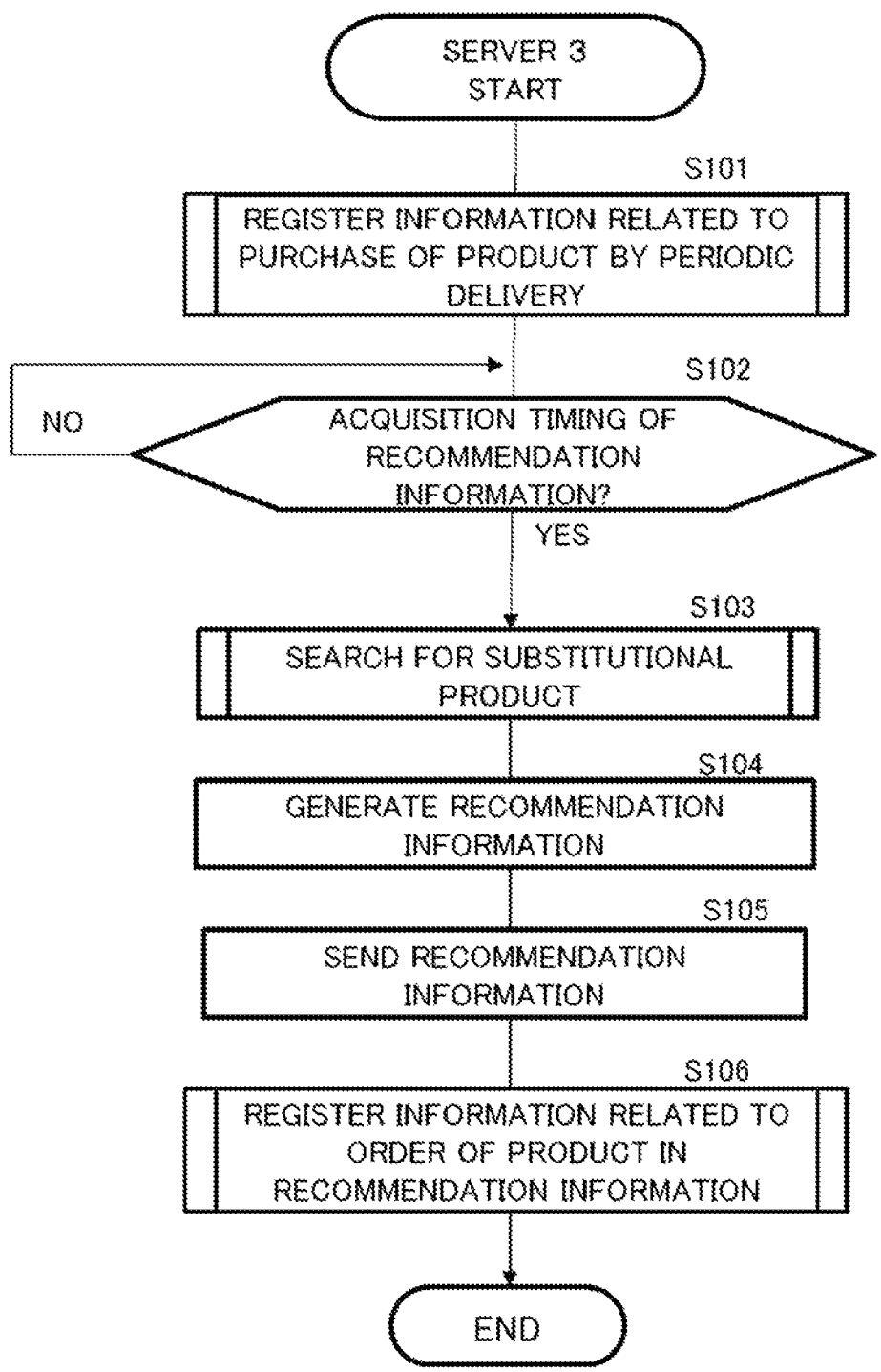
FIG. 4 if a flow chart depicting a processing example in a server.

FIG. 4 is a flow chart depicting a processing example in the server 3, and is a process example performed by the processor 21 of the server 3. In the server 3 (information processing apparatus 20 that operates as the server 3), the processor 21 of the server 3 performs the following processing steps by executing the program stored in the storage device 22.

In step S101, the processor 21 of the server 3 registers information relating to the purchase by the periodic delivery of the product. In other words, the processor 21 of the server 3 registers the contract related information, received from the terminal 2 via the network 1, to the user database (user DB) stored in the storage device 22 of the server 3.

FIG. 5 is a table indicating a data structure example of the user DB. In FIG. 5, the user DB has a table structure, and the table includes a record for each user. The record includes user personal information, product information, purchase condition information, and user setting information associated with user identification information (user ID). In the case where there are two or more periodic purchase products, the product information, the purchase condition information, and the user setting information are registered for each periodic purchase product.

For example, the user personal information may include information indicating a name, a contact address (at least one of a telephone number and an email address), and a delivery address (in the case when it is different from the contact address. The information types are not limited to these examples.

As an example of the product information, identification information of the product (product ID) is registered. In the table in FIG. 5, the name of the product, the category of the product (product type), the suggested sales price and the detailed information associated with the product ID are also registered, but this information may be omitted. The items of the product information are not limited to these examples. The detailed information is information indicating at least one of the profile and the features of the product. For the detailed information, at least one information is selected from the manufacturing place or the production place (e.g. manufacturing country or production country), the manufacturer or producer, the brand name, the standard (specification), performance, quality, functions, efficacy, and the like. Furthermore, the detailed information may include information indicating whether the product is a brand name product. The content of the detailed information is not limited to the above examples. The type of product does not matter as long as the product is a target of the periodic delivery. The products include food and beverages, daily necessities (e.g. such consumables as toilet paper), clothing, electronic products, sports and leisure goods, and the like.

The purchase condition information includes the purchase price of the product and the periodic-delivery day. The purchase condition information may also include a number of times of purchase. The length of the interval of periodic deliveries may be arbitrarily set.

The user setting information includes information indicating the search range of the product. The information indicating the search range of the product is information indicating one of: an identical product of the periodic-purchase product, an equivalent product of the periodic-purchase product, and both an identical product and an equivalent product, which the user set in the search range. The information indicating the type of performance is information indicating which type (brand, price of product, features of product) the user values. The search number includes information indicating a number of substitutional products included in the recommendation information.

The user setting information includes information indicating the predetermined period. The information indicating the predetermined period is information to determine a predetermined period that includes at least the next periodic-delivery day determined by the user. The predetermined period is three days, that is, the periodic-delivery day (delivery-scheduled day) and the previous day and next day of the delivery-scheduled day, but is not limited to this example.

The user setting information may also include information indicating the setting of the search mode by the user. The search mode indicate a mode to select a target substitutional product of the recommendation information, out of a plurality of substitutional products. The search mode includes a first mode, a second mode and a third mode. The first mode is a mode to select a substitutional product in accordance with the type of preference (ranking thereof). The second mode is a mode to select a substitutional product using at least one of: information indicating the ranking of sales, information indicating the ranking of evaluation, and information indicating whether the product is a generic product or not. The third mode is a mode to select a substitutional product by combining the type of preference and at least one of: information indicating the ranking of sales, information indicating the ranking of the evaluation, and information indicating whether the product is a generic product or not. The information indicating the setting of the search mode indicates one of the first to third modes that the user set.

FIG. 6 is a table indicating the data structure example of the product database (product DB). The product DB is a database in which information relating to the products that can be purchased by the periodic delivery (periodic purchase), and is stored in the storage device 22 of the server 3.

The product DB has a table structure, and the table is constituted of records for each product ID. The record includes the product information, the preference type information, the support site information, and the equivalent product information, stored in association with the product identification information (product ID).

The product information includes the name, category, suggested sales price, detailed information, and the like, as described in the user DB. The preference type indicates a preference type stored in association with the product in advance. In other words, the preference type indicates which type of preference: the brand, price and features, matches with the product. The support site information indicates an address (e.g. the IP address of the server 4, URL) of the support site where information on the product is posted. The equivalent product information includes the product ID and the product information of the product that is stored in association with the product as an equivalent product. If there are a plurality of equivalent products, the product ID and the product information of each equivalent product are registered. The product ID can be searched using the product ID included in the user information.

Generation and Notification of Recommendation Information

Processing related to the generation of recommendation information by the server 3 will be described next. As indicated in step S102 in FIG. 4, the processor 21 of the server 3 determines whether the acquisition timing of the recommendation information has arrived. The information indicating the acquisition timing of the recommendation information is stored in association with the user ID in the storage device 22 of the server 3, and is referred to by the processor 21. The acquisition timing may be set by the user 11 or may be set by anyone other than the user 11. Processing advances to step S103 if it is determined that the acquisition timing has arrived (YES in S102).

Determination whether the acquisition timing of the recommendation information has arrived or not may be performed in the terminal 2, and the terminal 2 may request the server 3 to provide the recommendation information in the case where the acquisition timing has arrived. In this case, in step S102, it is determined whether the request to provide the recommendation information is received or not.

In step S103, the processor 21 of the server 3 performs the search processing for a substitutional product. FIG. 7 is a flow chart indicating an example of the search processing for a substitutional product. In step S201, the processor 21 of the server 3 extracts a record corresponding to the user ID of the user 11 from the user DB (FIG. 5) stored in the storage device 22, and acquires the user information registered in the extracted record. Furthermore, the processor 21 extracts a record in the product DB (FIG. 6) corresponding to the product ID included in the extracted record, and acquires information in this record (e.g. product information).

In step S202, the processor 21 of the server 3 determines the range of the products to be searched. In other words, the processor 21 determines, in accordance with the user setting information, which one of: the identical product, equivalent product, and both identical product and equivalent product, will be searched for the substitutional products.

In step S203, the processor 21 of the server 3 determines the search mode of the substitutional product in accordance with the user setting information. For the search mode, the processor 21 determines one of the first mode to the third mode.

In step S204, the processor 21 of the server 3 determines a search number of the substitutional product in accordance with the user setting information. In step S205, the processor 21 of the server 3 determines a predetermine period that includes the delivery-scheduled day in accordance with the user setting information.

In step S206, the processor 21 of the server 3 generates an inquiry message to inquire a support site about information indicating the sales schedule of the substitutional product that matches with the search range, search mode and search number which are determined respectively, out of the substitutional products that are sold within a predetermined period. The support site is operated by the server 4. The processor 21 of the server 3 sends the generated inquiry message to the server 4. At this time, the inquiry message includes an instruction to search information on at least one of: a periodic-purchase product (identical product), and an equivalent product of the periodic-purchase product registered in the record in the extracted product DB, as the substitutional product to be searched.

In the server 4, the processor 21 of the server 4 searches information indicating the sales schedule of the substitutional product in accordance with the inquiry, from the information posted on the support site. The processor 21 of the server 4 generates a reply message, including the result of the search, and performs processing to send the message to the server 3. The reply includes information indicating the day when each substitutional product can be delivered to the region where the delivery place of the user 11 is located. In step S207, the server 3 receives the reply of the inquiry. By the reception of the reply of the inquiry, the processor 21 of the server 3 can acquire information indicating the sales schedule of the substitutional product in a predetermined period that includes the next delivery-scheduled day.

In step S104, the processor 21 of the server 3 generate the recommendation information that includes the information indicating the sales schedule of the substitutional product included in the reply from the server 4. The recommendation information is information that includes the recommendation to deliver the substitutional product on the delivery-possible day, instead of delivering the periodic-purchase product on the delivery-scheduled day. The processor 21 determines a delivery-possible day of each substitutional product included in the reply from the server 4, as the delivery-possible day, and includes this date in the recommendation information. In step S105, the processor 21 of the server 3 sends a message, including the recommendation information, to the terminal 2.

In the terminal 2, it is determined whether a message including the recommendation information is received in step S002 (YES in S002). Then in step S003, the processor 21 of the terminal 2 displays the recommendation information on the display 25. Thereby the recommendation information is notified to the user 11. The user 11 can receive the provided recommendation information by referring to the display 25.

For the recommendation information, information indicating the sales schedule of the substitutional product searched in accordance with the search range is displayed on the display 25. The substitutional product is at least one of: an identical product of which price is lower than the periodic-purchase product, and an equivalent product of the periodic-purchase product. Further, the recommendation of the purchase of the substitutional product, including the delivery-possible day of the substitutional product, is displayed on the display 25 as the recommendation information. The recommendation information may also include information to prompt the order of the substitutional product, and information to promote the purchase of the substitutional product may be displayed on the display 25.

In a case where the search mode is the first mode in which brand is valued, information indicating the sales schedule of the substitutional product, that is defined as a brand name product in the product information, is displayed on the display 25. In a case where low price is valued, information indicating the sales schedule of the substitutional product, of which sales prices is lowest (or of which ranking of price is within predetermined ranks in a price ascending order) is displayed on the display 25, regardless whether the product is a brand name product or not. In a case where the features are valued, information indicating the sales schedule of the substitutional product, of which features set by the user are regarded as equivalent to that of the periodic-purchase product, is displayed on the display 25.

In a case where the search mode is the second mode, information indicating the sales schedule of the substitutional product, of which sales ranking is within a predetermined ranking in a descending order, or of which evaluation ranking is within a predetermining ranking in a descending order, is displayed on the display 25. In the second mode, in some cases, information indicating the sales schedule of the substitutional product corresponding to a generic product of the periodic-purchase product, or of an equivalent product of the periodic-purchase product, may be displayed.

In a case where the search mode is the third mode, information indicating the sales schedule of the substitutional product, of which sales ranking or evaluation ranking is within a predetermined ranking in a descending order, and of which type of preference matches with the type of preference of the user, is displayed on the display 25. The recommendation information is provided to the user 11 as information to recommend to purchase the substitutional product that can be delivered in a predetermined period instead of the periodic-purchase product.

In step S004, processing related to ordering of the substitutional product in the recommendation information is performed. In other words, the user 11 operates the input device 24, and inputs the order information (example of instruction input) for the desired substitutional product, out of one or two or more substitutional products indicated in the recommendation information. The order information includes an order instruction, personal information (name, contact address and delivery address) of the user 11, and number of order items, and desired delivery day which the user selected from the delivery-possible days.

When the order information from the user 11 is received, the processor 21 of the terminal 2 performs processing to send the message to request the order, including this order information, to the server 3. In the case where ordering the substitutional product is not desired, the user 11 can stop display of the recommendation information without performing the order operation. In this case, the periodic-purchase product is delivered on the delivery-scheduled day.

When the server 3 receives the message to request the order, the processor 21 of the server 3 registers the order information of the substitutional product to the record of the user 11 in the user DB (step S106). Then the processor 21 of the server 3 performs the processing to transfer the order information to the shop that is scheduled to sell the substitutional-purchase product (e.g. support side of the server 4).

The server 3 may be omitted, and the processing performed by the server 3 may be performed by the terminal 2.

Effect of Embodiment

According to the embodiment, information indicating the sales schedule of the substitutional product in a predetermined period and the recommendation information including the delivery-possible day, are provided to the user 11 who purchases the product by periodic delivery. Instead of purchasing the periodic-purchase product, the user 11 can purchase an identical product or equivalent product of which price is lower, an equivalent product which matches with the preference of the user 11, an equivalent product of which sales or evaluation ranking is high, a generic product of the periodic-purchase product or an equivalent product of the periodic-purchase product, and the like. Therefore compared with the case of simply receiving the periodic-purchase product periodically, satisfaction level of the user 11 for the periodic-purchase service can be increased. A part of or all of the processing steps performed by the server 3 may be executed by the terminal 2. In this case, the terminal 2 is regarded as an example of the "information processing apparatus (computer)". The configurations described in the embodiment may be combined as necessary.

Other

The embodiment described above is merely an example, and the present disclosure may be changed and modified as required without departing from the spirit and scope thereof.

The processing steps executed by one device in the above description may be shared by a plurality of devices. Further, the processing steps executed by different devices in the above description may be executed by one device. In a computer system, the hardware configuration (server configuration), to implement each function, can be flexibly changed.

The present disclosure may be implemented by supplying a computer program, having the functions described in the above embodiment, to a computer, with at least one processor of the computer reading and executing the program. The computer program may be provided to the computer using a non-transitory computer readable storage medium that can be connected to the system bus of the computer, or may be provided to the computer via a network. The non-transitory computer readable storage medium is an arbitrary type of disk, for example, such as a magnetic disk (e.g. floppy® disk, hard disk drive (HDD)), and an optical disk (e.g. CD-ROM, DVD, Blu-ray disk). The non-transitory computer readable medium includes a read only memory (ROM), a random access memory (RAM), an EPROM, an EEPROM, a magnetic card, a flash memory, an optical card, and an arbitrary type of medium appropriate for storing electronic instructions.

What is claimed is:

1. An information processing apparatus comprising:
a controller configured to:
acquire user information including at least a search mode selected from a plurality of search modes;
determine, based on at least a product which a user has been purchasing by periodic delivery and the selected search mode, a substitutional product of the product;
acquire information indicating a sales schedule of the substitutional product in a predetermined period including a next delivery-scheduled day of the product;
determine a delivery-possible day when the substitutional product can be delivered to the user, based on the information indicating the sales schedule of the substitutional product; and
provide the user with recommendation information, which is information including a proposal to deliver, instead of delivering the product on the delivery-scheduled day, the substitutional product on the delivery-possible day.

2. The information processing apparatus according to claim 1, wherein:
the substitutional product includes an identical product of the product, which is enable to purchase at a lower price than a purchase price of the product, and
the controller is configured to acquire information indicating the sales of the identical product as the information indicating the sales schedule of the substitutional product.

3. The information processing apparatus according to claim 1, wherein
the substitutional product includes an equivalent product of the product, and
the controller is configured to acquire information indicating the sales of the equivalent product as the information indicating the sales schedule of the substitutional product.

4. The information processing apparatus according to claim 1, wherein the controller is configured to acquire information relating to the sales schedule of the substitutional product that is selected in accordance with the preference of the user out of one or two or more substitutional products that are sold within the predetermined period.

5. The information processing apparatus according to claim 4, wherein:
the preferences include a type of valuing a brand of a product; a type of valuing a price of a product, and a type of valuing a feature of a product; and
the controller is configured to acquire information indicating the sales schedule of the substitutional product that meets the type of the preference of the user.

6. The information processing apparatus according to claim 1, wherein the controller is configured to acquire information indicating the sales schedule of the substitutional product selected from one or two or more substitutional products that are sold within the predetermined period, using at least one of: information indicating a sale of each substitutional product; information indicating evaluation of each substitutional product; and information indicating whether each substitutional product is a generic product of the product or of an equivalent product of the product.

7. The information processing apparatus according to claim 1, wherein the controller is configured to execute processing to order the substitutional product in accordance with an instruction input by the user for the recommendation information.

8. An information processing method, comprising:
acquiring user information including at least a search mode selected from a plurality of search modes;
determining, based on at least a product which a user has been purchasing by periodic delivery and the selected search mode, a substitutional product of the product;
acquiring, by an information processing apparatus, information indicating a sales schedule of the substitutional product in a predetermined period including a next delivery-scheduled day of the product;
determining, by the information processing apparatus, a delivery-possible day when the substitutional product can be delivered to the user, based on the information indicating the sales schedule of the substitutional product; and providing, by the information processing apparatus, the user with recommendation information, which is information including a proposal to deliver, instead of delivering the product on the delivery-scheduled day, the substitutional product on the delivery-possible day.

9. The information processing method according to claim 8, wherein:
the substitutional product includes an identical product of the product, which can be purchased at a lower price than the purchase price of the product, and
the method further comprises acquiring, by information processing apparatus, information indicating the sales of the identical product as the information indicating the sales schedule of the substitutional product.

10. The information processing method according to claim 8, wherein:
the substitutional product includes an equivalent product of the product, and
the method further comprises acquiring, by information processing apparatus, acquiring information indicating the sales of the equivalent product as the information indicating the sales schedule of the substitutional product.

11. The information processing method according to claim 8, further comprising acquiring, by the information processing apparatus, information relating to the sales schedule of the substitutional product that is selected in accordance with the preference of the user out of one or two or more substitutional products that are sold within the predetermined period.

12. The information processing method according to claim 11, wherein:
the preferences include a type of valuing a brand of a product; a type of valuing a price of a product, and a type of valuing a feature of a product; and
the method further comprises acquiring, by the information processing apparatus, information indicating the sales schedule of the substitutional product that meets the type of the preference of the user.

13. The information processing method according to claim 8, further comprising acquiring, by the information processing apparatus, information indicating the sales schedule of the substitutional product selected from one or two or more substitutional products that are sold within the predetermined period, using at least one of: information indicating a sale of each substitutional product; information indicating evaluation of each substitutional product; and information indicating whether each substitutional product is a generic product of the product or of an equivalent product of the product.

14. The information processing method according to claim 8, further comprising executing, by the information processing apparatus, processing to order the substitutional product in accordance with an instruction input by the user for the recommendation information.

15. A non-transitory storage medium storing a program that causes a computer to execute:
acquiring user information including at least a search mode selected from a plurality of search modes;
determining, based on at least a product which a user has been purchasing by periodic delivery and the selected search mode, a substitutional product of the product acquiring information indicating a sales schedule of the substitutional product in a predetermined period including a next delivery-scheduled day of the product;
determining a delivery-possible day when the substitutional product can be delivered to the user, based on the information indicating the sales schedule of the substitutional product; and
providing the user with recommendation information, which is information including a proposal to deliver, instead of delivering the product on the delivery-scheduled day, the substitutional product on the delivery-possible day .

16. The non-transitory storage medium according to claim 15, wherein:
the substitutional product includes an identical product of the product, which can be purchased at a lower price than the purchase price of the product; and
the program causes the computer to execute acquiring information indicating the sales of the identical product as the information indicating the sales schedule of the substitutional product.

17. The non-transitory storage medium according to claim 15, wherein:
the substitutional product includes an equivalent product of the product; and
the program causes the computer to execute acquiring information indicating the sales of the equivalent product as the information indicating the sales schedule of the substitutional product.

18. The non-transitory storage medium according to claim 15, wherein the program causes the computer to execute acquiring information relating to the sales schedule of the substitutional product that is selected in accordance with the preference of the user, out of one or two or more substitutional products that are sold within the predetermined period.

19. The non-transitory storage medium according to claim 18, wherein:
the preferences include a type of valuing a brand of a product; a type of valuing a price of a product, and a type of valuing a feature of a product; and
the program causes the computer to execute acquiring information indicating the sales schedule of the substitutional product meeting the type of the preference of the user.

20. The non-transitory storage medium according to claim 15, wherein the program causes the computer to execute acquiring information indicating the sales schedule of the substitutional product selected from one or two or more substitutional products that are sold within the predetermined period, using at least one of: information indicating a sale of each substitutional product; information indicating evaluation of each substitutional product; and information indicating whether each substitutional product is a generic product of the product or of an equivalent product of the product.

* * * * *